US010194600B1

United States Patent
Keller, Sr.

(10) Patent No.: US 10,194,600 B1
(45) Date of Patent: Feb. 5, 2019

(54) 4 STAGE 11 COMPONENT HYDROPONICS PLANT COLLAR INSERT SYSTEM

(71) Applicant: Robert Charles Keller, Sr., Tully, NY (US)

(72) Inventor: Robert Charles Keller, Sr., Tully, NY (US)

(73) Assignee: Robert Charles Keller, Tully, NY (US)

( * ) Notice: Subject to any disclaimer, the term of this patent is extended or adjusted under 35 U.S.C. 154(b) by 350 days.

(21) Appl. No.: 14/999,580

(22) Filed: May 31, 2016

(51) Int. Cl.
A01G 24/48 (2018.01)
A01G 31/02 (2006.01)

(52) U.S. Cl.
CPC .............. *A01G 31/02* (2013.01); *A01G 24/48* (2018.02)

(58) Field of Classification Search
CPC ................................ A01G 31/02; A01G 24/48
See application file for complete search history.

*Primary Examiner* — Kevin R Kruer

(57) ABSTRACT

This invention relates to agriculture, hydroponics, the art of growing plants indoors. True hydroponics requires living plants to grow directly in water and water only. This system allows for vegetation to be hung over water and is comprised of a system of collars that wrap around the stem or stalk of living plants to secure them within a system of support cuffs.

1 Claim, 16 Drawing Sheets

100

100

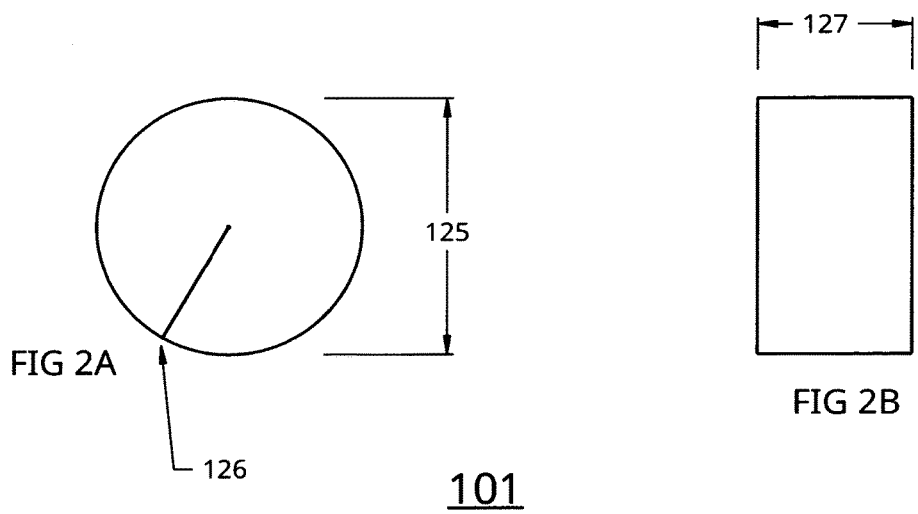
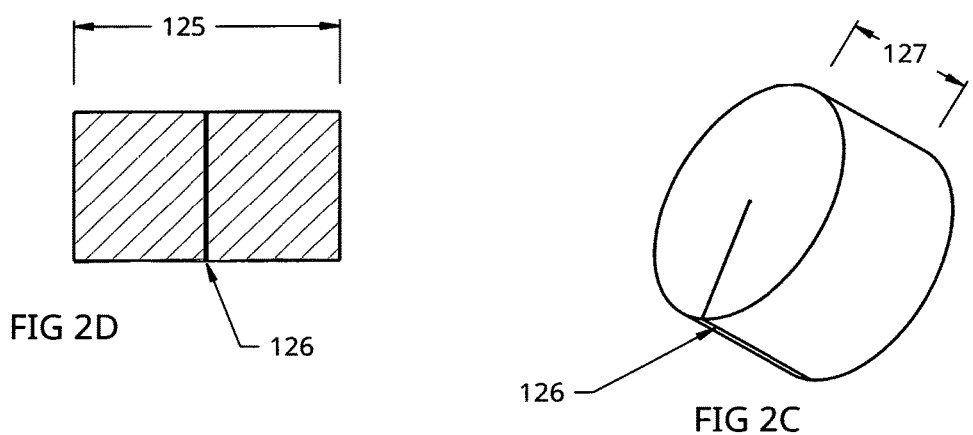

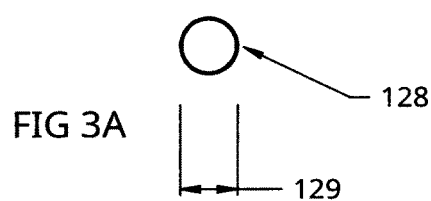
FIG 3A
102
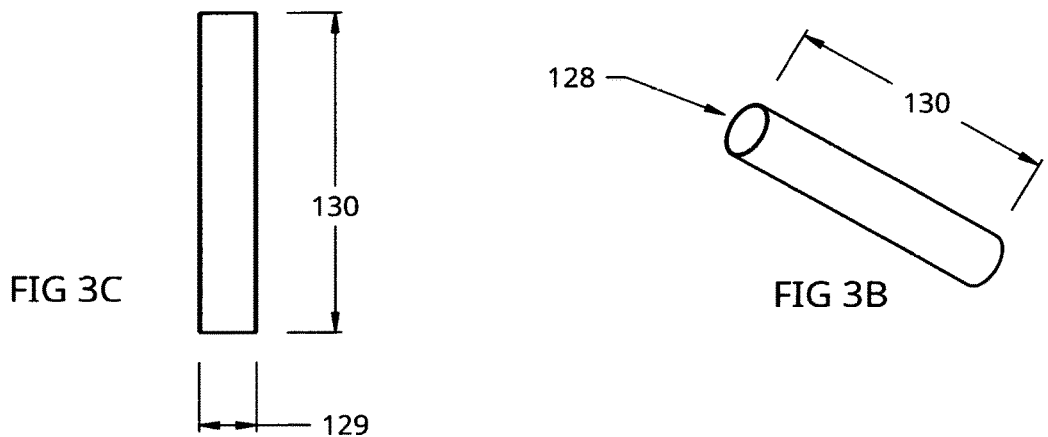
FIG 3C
FIG 3B

103

104

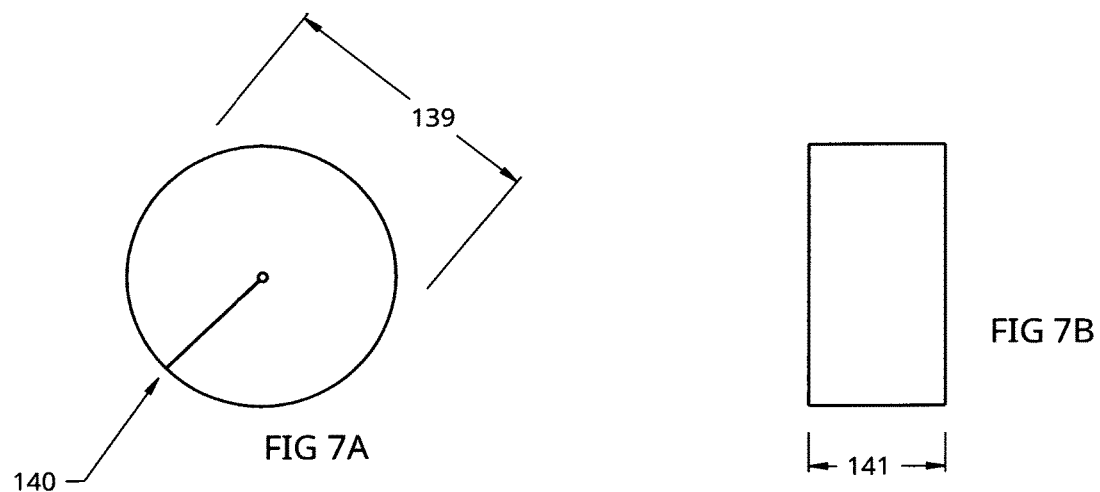
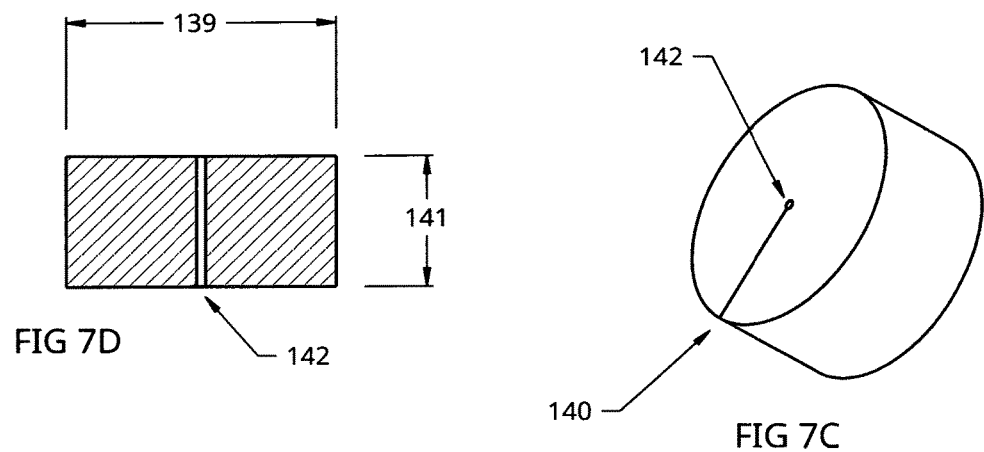
105

106

149

107

108

109

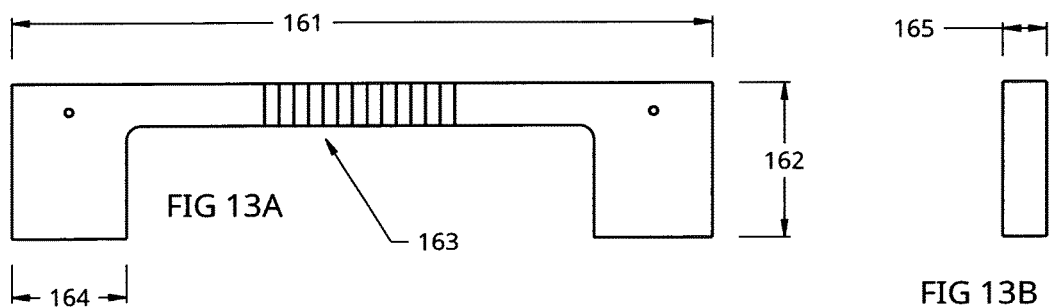
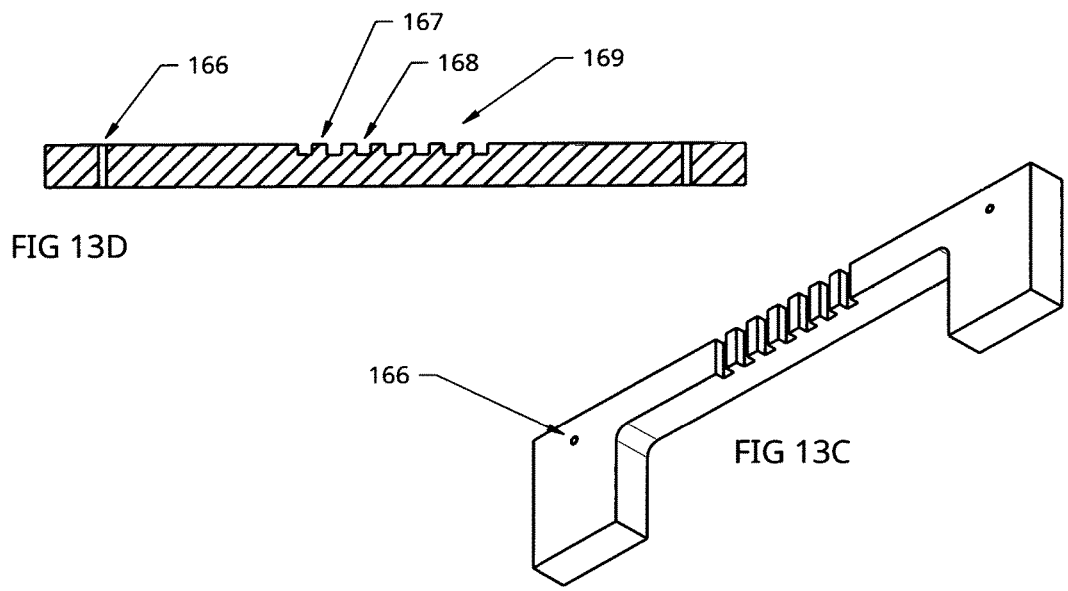

111

ID="1" />
4 STAGE 11 COMPONENT HYDROPONICS PLANT COLLAR INSERT SYSTEM

BACKGROUND OF INVENTION

Hydroponics,

Hydroponics may simply be described as growing plants with nutrients and water, and without soil. The water must be delivered to the plant root system. The root system may hang directly in the nutrient solutions, be misted by it or can be enclosed within a container or a trough which is filled with a substrate [a replacement for soil] the substrate may consist of many different types of materials such as perlite, coir, expanded clay, vermiculite, pumice, gravel or rock wool. All substrates must provide good water holding capacity yet be porous for gas exchange. All substrates must provide good water holding capacity, but this is where insects and fungi live, thrive and damage plant root systems. In between watering, substrates become the storage location of water and nutrients for the plant root system and also food and shelter for insects and fungi. The roots grow within the substrate while securing the plant within the container or trough. This provides a fertile delta for insects and fungi that can only be treated with chemicals. Commercial and small scale agriculture can use organics or beneficial insects.

There are many techniques to deliver water to the plant root zone. For container grown plants each individual plant is provided an emitter for water in the form of a drip irrigation system. Water may be channeled to a continuous row of plants with in a trough, such as in the nutrient film technique system. A large tray of plants may be watered from below by filling the entire tray with water and then draining all excess water. This is called Ebb and flood irrigation. Water is typically recycled within nutrient film technique and ebb and flood systems. It is more difficult to recycle in a drip irrigation system and require additional equipment such as water, a sterilizer and fertilizer monitoring and adjustment equipment.

FIELD OF ENDEAVOR

Hydroponics with Substrate
Growing Plants in Water with Substrates

Hydroponics is a technology for growing plants in nutrient solutions (water containing nutrients) with or without the use of an artificial medium such as, perlite, coir, expanded clay, vermiculite, pumice, gravel or rock wool to provide root system support. Liquid hydroponics systems have no other supporting medium for the plant's root system (not in use): aggregate systems have a solid medium for support (in use). Hydroponic systems are further categorized as open (i.e.; once the nutrient solutions are delivered to the plant roots, it is not reused but discarded) or closed (i.e.; surplus solution is recovered replenished and recycled).

The two types of systems, both currently use substrates, neither is true hydroponic
  a) Static solutions culture
  1) Deep water culture 2) Wick System
  b) Substrate culture
  1) Continuous flow solution culture 2) Substrate 3) Ebb and Flow
  4) Nutrient Film Technique 5) Aero-ponics 6) Drip irrigation System Hydroponics with substrate uses all of the aforementioned aggregates and inert materials to anchor the plant's roots. These are all of the different materials that allow a different methodology or technique to grow plants with. All of these methods use the same basic tools to start a seed or a root cutting, the rock-wool cube is used. This is simple, but not true hydroponics. With substrate use comes several problems that are endemic to substrate use. First, artificial soils are un-natural to the plants root systems causing root stress. Second, there is little room for root system expansion causing root binding and stunting growth. Third, there is little room for root growth beyond gaps in the substrate and holes in net pots, thus pinching individual root and stunting growth. Fourth, impacted roots systems are weak and susceptible to to root rot and fungal growth. Fifth, substrate by creation retains moisture therefore attracting insects by providing proper habitat for insect breeding.

PRIOR ART

There is no prior art to express my invented system, there were no tools, system or combination of both created prior to my methodology and my hydroponics component system. I present the following popular substrates currently used in hydroponics to demonstrate current methods. The use of substrates increases the use of all insecticides, fungicides, and other chemical treatments for agricultural problems.

Media

True hydroponics, plant grown directly in water, without the use of substrate. The use of media is simple, cheap and required if you are to grow in a current hydroponics systems or deep water cultivation systems. There are many of these substrates and combinations of substrates. One of the most obvious decisions hydroponic farmers have to make is which medium they should use. Different media are appropriate for different growing techniques. Growing without any media is smart, easy, clean, uses less chemicals and produces better plants.

Expanded Clay

Baked clay pellets, also known under the trade marks Hydroton or Hydrokorrels or LECA for light expanded clay aggregate. All are suitable for hydroponics systems in which all nutrients are carefully controlled in water solution. The clay pellets are inert, pH neutral and do not contain any nutrient value. Some clay leach metals into solutions when in contact with petro-chemical-fertilizers. The clay is formed into round pellets and fired in rotary kilns at 1,200° C., 2,190° F. This causes the clay to expand, like popcorn, and become porous. It is light in weight and does not compact over time. Shape is individual. Pellets can be irregular or uniform depending on brand and manufacturing process. The manufacturers consider expanded clay to be an ecologically sustainable and reusable growing medium, but commercial and residential users discard used clay infused with roots due to cleaning costs. A more popular view is that clay pebbles are best not re-used even when they are cleaned. This is due to root growth which may enter the medium's porosity. Breaking open a clay pebble after a crop has been shown to reveal this growth. Another view is that although the pellets do not compact, the root system must grow through the holes and splits that are formed when clay is placed in a net pot. This space for root growth is quickly used up and the clay becomes infused in root and the root ball is then hard to treat for disease, root rot or insect infestation. This in turn increases insecticide, fungicide and other chemical use. Expanded clay is not recyclable, compostable, nor convertible to other uses.

Rock Wool

Rock wool or mineral wool is probably the most widely use medium in hydroponics. Rock wool is an inert substrate for most hydroponics systems, such as drain to waist, thin film technology, recirculating systems, and deep water culture. It is made from molten rock spun into cotton candy like fibers, resulting in a fibrous medium accessible to capillary action that is not degraded by microbiological activity. Higher density also improves the wicking and dispersion of moisture and nutrients enticing root into more areas of medium and therefore increasing nutrient fueled sites for premium plant production.

Rock wool porosity or water holding ability is also a liability. Moisture creates warm breeding habitats for bacterial and fungal problems and also breeding habitat for insects which feeds insect growth. Rock wool is not reusable, recyclable, compostable, nor convertible to other uses. It is a single use product. Rock wool increases the use of chemical based insecticides and fungicides due to it's ability to mimic soil's porosity.

Coir

Coco Peat, also known as coir or coco, is the leftover material after the fibers have been removed from the outer most shell or bolster of the coconut. Coir is a 100% natural grown and flowering medium. Coconut coir is colonized with Trichoderma bacteria which protects roots and stimulates root growth. It is extremely difficult to over water coir due to its perfect air to water ratio. Plant roots thrive in this environment, coir has a high cation exchange, meaning it can store unused minerals to be released to the plant as and when it requires it. Coir is available in many forms most common is coco peat which has the appearance and texture of soil but contains no mineral content.

Coir is not sustainable, a product that started out as a by-product is shown to be highly valued in the hydroponics market. Demand out strips supply and supply grows by taking coconuts for bolster only. Palm oil waste in Indonesia is sold to New Zealand dairy farmers for feed and has become more valued than that of palm oil Perlite Perlite is a volcanic rock that has been super heated into very lightweight expanded glass pebbles. It is used loose or in plastic sleeves immersed in the water. It is also used in potting soils mixes to decrease soil density. Perlite has similar properties and uses to vermiculite but generally holds more air and less water. This volcanic rock is naturally fused at high temperature undergoing what is called fusionic metamorphosis. A single use product, not compostable, not recyclable.

Vermiculite

Vermiculite is another mineral that has been superheated until it has expanded into light pebbles. Vermiculite holds more water than perlite and has a natural wicking property that can draw water and nutrients in a passive hydroponic system. A single use product, not compostable, not recyclable.

Pumice

Pumice is volcanic rock cinders and is a naturally occurring porous light weight volcanic rock that holds moisture and air in catacomb like surfaces. Light and easy to work with but the natural process that creates the pumice leaves it with sharp edges that damage roots systems as they grow and compress the medium. A single use product, not compostable, not recyclable.

Gravel

Gravel is one of the original hydroponic media, a little heavy, gravel is inert, does not hold water, drains too well but isn't expensive. Still popular today, gravel is simple to water. Will not hold moisture, therefore will not hold nutrient and or oxygen on its outer surfaces. A single use product, not compostable, not recyclable.

Neoprene

Relatively recent to hydroponics, A single use product for use when rooting cuttings, specifically for use in clone starting equipment. Neoprene breaks down or leaches components that turn feed water to slime when in contact with petro-chemical fertilizers. Neoprene is a discarded single use product.

When cloning with neoprene, there is access to the root ball when impacted by insects, molds, fungi or bacteria. Neoprene is not recyclable, compostable, nor convertible to other uses.

Hydroponics without Substrate

Four Stage 11 Component Hydroponics System

A System for Hanging Roots Directly in Nutrient Solution

There is a need for a system of collars that can support a plant without the use of substrate. New technology provides a system of collars that can work in existing hydroponic systems and create a pure hydroponics culture. New technology teaches how to hang a plant over water with roots suspended in water. There is a need for a 4 stage 11 component hydroponics system of collars.

4 stage hydroponic insert component system, is a system of 11 components, that work together, these collars are used successively in a true hydroponic environment, that is to hang plants over a nutrient solution. The 11 components that are used during the 4 stages of plant growth are all new inventions, working together in succession or in combination for pure hydroponics. There are no substrates used with this hydroponic growing methodology. This methodology is to support plants directly over water without any other inert materials encumbering the root system. This hydroponic method utilizes collars that wrap around the plant stem just above the plants root crown to support the plant and said collar then fits into a collar support cuff. This collar/cuff combination allows you to hang a plant over water so that the root system floats in a static solution.

These tools are the first complete set for true hydroponics work. These tools control plant growth from seed to fruiting plant. This keeps the plant in a pure hydroponic discipline and while doing so, keeps 90% of the problems attributed to substrate cultivation at arms distance. This invention does not address substrates and their innate problems, all substrates have their problems and advantages that are unique and endemic to substrate hydroponics.

The 4 stage insert component method does not address substrate problems.

SUMMARY OF INVENTION

This system's hydroponics methodology and components usher in a new dynamic in hydroponic gardening. This system replaces all substrate use in hydroponic gardening, reduces pesticide, fungicide, mold inhibitors and disinfectant use. A system of washable, sustainable, re-usable, environmentally safe, indestructible hydroponics components to grow plants directly in water.

DESCRIPTION OF INVENTION

The description of the current invention is a hydroponics performance component system that allows for the propagation of edible and non-edible plants. This system of components each works successively, one after another during the plants 4 stages of life. Starting with seed germination through plant fruiting, a successive course of plant collars and support cuffs are used for the support of said plant over water. My invention consists of 6 special foam collars, 1 cedar wood EXO support system comprised of 2 collars, 1 root guide tool, 1 light reflector, 2 collar support cuffs. Plant collars wrap around plant stem to support a plant and do not inhibit the plant's root system.

BRIEF DESCRIPTION OF THE INVENTION

This invention is a process for growing plants directly in water without substrates or mediums using a combination of 2 different foam rubbers, 1) 1034 is used for 3 devices. 2) T50 is used for 3 devices, for a total 6 collars and a cedar wood 4 part combination for the seventh collar. Collars work by being wrapped around the plants stem or stalk and in conjunction with a support cuff that the collars, with plant, fit into and expand into for stability. The root guide tool works with the seed germination collar to protect and guide the primary root tip out of the seed germinating foam collar. Each device works within the 4 stages of plant life to support said plant for just that period of growth.

Figures 1A, 1B:
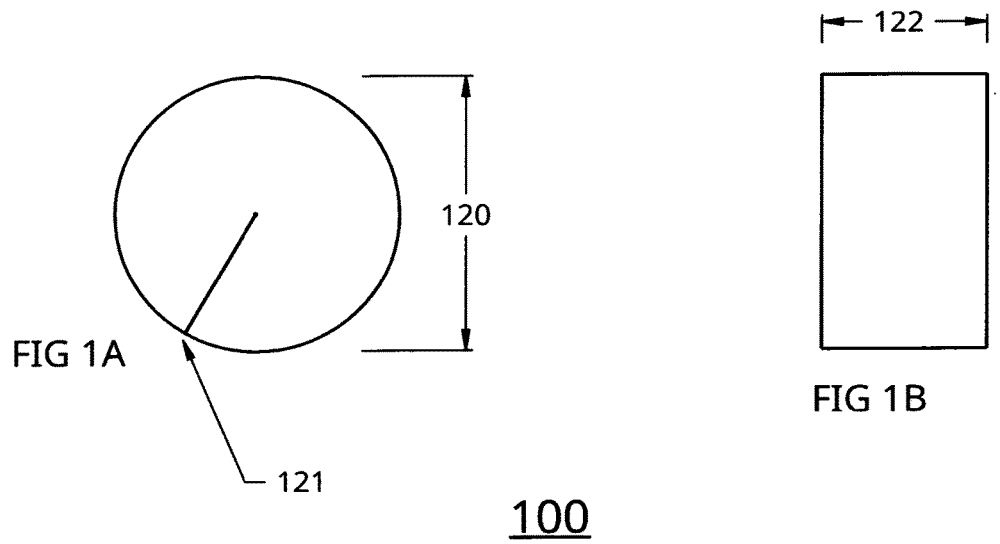
FIG. 1 A top view of type T50 seed germination collar
FIG. 1 B side view of type T50 seed germination collar of FIG. 1 A
FIG. 1C oblique view of T50 seed germination collar of FIG. 1 A
FIG. 1 D cross section view of T50 seed germination collar with root guide and seed
FIG. 2A top view of type 1034 seedling collar
FIG. 2B side view of type 1034 seedling collar of FIG. 2A
FIG. 2C oblique view of 1034 seedling collar of FIG. 2A
FIG. 2D cross section view of 1034
FIG. 3A top view of root guide tool
FIG. 3B oblique view of root guide tool of FIG. 3A
FIG. 3C side view of root guide tool of FIG. 3A
FIG. 4A top view of 2" device support cuff
FIG. 4B side view of 2" device support cuff of FIG. 4A
FIG. 4C oblique view of 2" device support cuff of FIG. 4A
FIG. 4D front view of 2" device support cuff of FIG. 4A
FIG. 5 exploded view of FIG. 1 B, FIG. 3C, FIG. 4D
FIG. 6A top view of 1034 vegetation collar
FIG. 6B side view of 1034 vegetation collar of FIG. 6A
FIG. 6C oblique view of 1034 vegetation collar of FIG. 6A
FIG. 6D cross section view of 1034 vegetation collar of FIG. 6A
FIG. 7A top view of T50 vegetation collar
FIG. 7B side view of T50 vegetation collar of FIG. 7A
FIG. 7C oblique view of T50 vegetation collar of FIG. 7A
FIG. 7D cross section view of T50 vegetation collar of FIG. 7A
FIG. 8A top view of 1034 flowering collar
FIG. 8B side view of 1034 flowering collar of FIG. 8A
FIG. 8C oblique view of 1034 flowering collar of FIG. 8A
FIG. 8D cross section view of 1034 flowering collar of FIG. 8A
FIG. 9A top view of T50 flowering collar
FIG. 9B side view of T50 flowering collar of FIG. 9A
FIG. 9C oblique view of T50 flowering collar of FIG. 9A
FIG. 9D cross section view of T50 flowering collar of FIG. 9A
FIG. 10A top view of 6" device support cuff
FIG. 10B side view of 6" device support cuff of FIG. 10A
FIG. 11 A top view of device heat shield
FIG. 11 B side view of device heat shield of FIG. 11 A
FIG. 12 Exploded view of FIG. 11A, FIG. 6C, FIG. 7C, FIG. 8C, FIG. 9C, FIG. 10B
FIG. 13A front view of upper EXO support collar
FIG. 13B side view of upper EXO support collar of FIG. 13A
FIG. 13C oblique view of upper EXO support collar of FIG. 13A
FIG. 13D cross section view of upper EXO support collar of FIG. 13A
FIG. 14A front view of lower EXO support collar of FIG. 14A
FIG. 14B side view of lower EXO support collar of FIG. 14A
FIG. 14C oblique view of lower EXO support collar of FIG. 14A FIG. 14D cross section view of lower EXO support collar of FIG. 14A
FIG. 15 exploded view of FIG. 13A, FIG. 14A and FIG. 10B
FIG. 16 assembled view of FIG. 13A, FIG. 14A and FIG. 10B
Figures 1C, 1D:
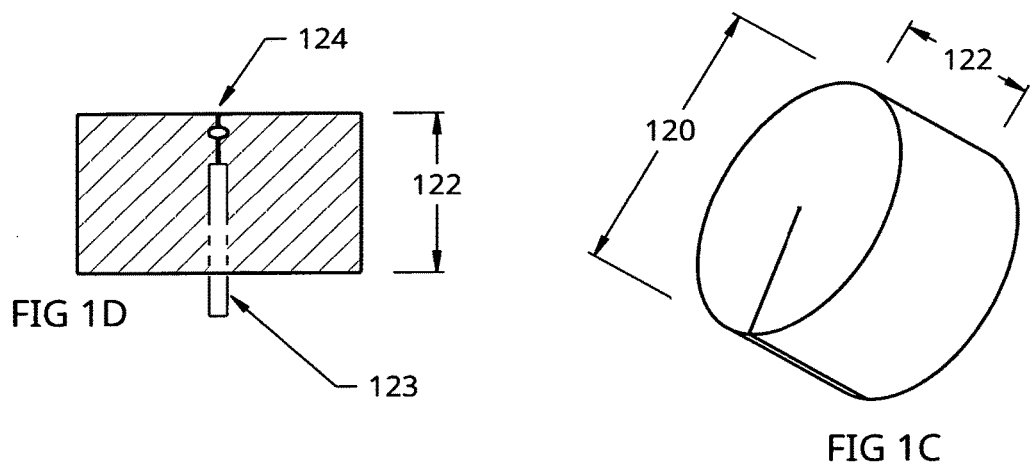
Figure 4A:
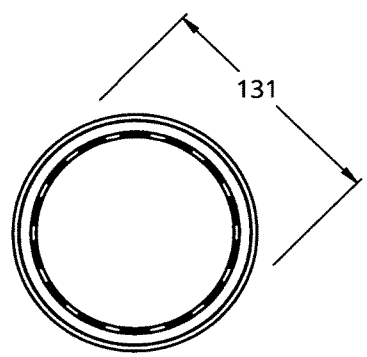
Figure 4B:
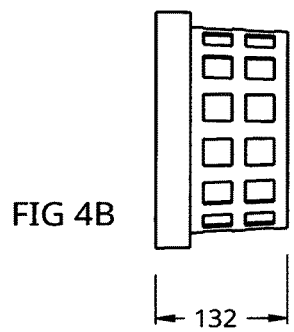
Figure 4D:
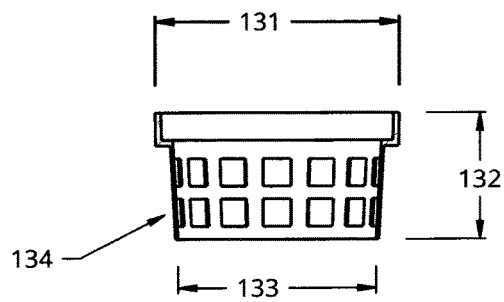
Figure 4C:
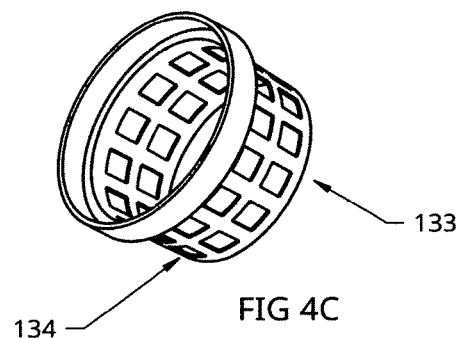

Seed Germination Collar Polyurethane Foam, T 50 FIG. 1.

Polyether polyurethane foam T 50, wet, see specification sheet. This collar is die cut round, collar dimensions are 1⅞" OD 100×1" thick, a round cut of foam, cut from T 50 polyurethane foam. A cut is from the center out to the perimeter the full depth of the collar, for seed placement, and root guide placement.

Polyether polyurethane foam T 50 is breathable and water attracting and retaining. Thus providing maximum moisture for seed germination and primary growth without the use of a surfactant or wetting agent. The seed germination collar is a washable, re-useable, environmentally safe and a recyclable component.

Spec. Sheet
T 50 foam
Polyether Polyurethane foam
Property Value
Cell count 50 ppi
Density 1.4 lbs./cu. ft.
25% compression force 0.55 lbs./sq. in. deflection (CDF)r
Tensile Strength 22 lbs./sq. in. minimum
Elongation 200% minimum
Tear Strength 4.5 lbs./in. minimum
Compression set @ 50% 20% loss maximum deflection
25% CLD autoclave loss 20% maximum Seedling Collar Polyurethane Foam 1034, FIG. 2

Polyurethane foam 1034, dry, see spec. sheet. FIG. 2, This collar is die cut round, collar dimensions are 1⅞" OD, ×1¼" thick, a round cut of foam. A cut from the center out to the perimeter the full depth of the collar, this is for seedling placement, for collar to fit around stem.

Polyurethane foam 1034 is breathable and water repelling thus providing perfect conditions for plant growth. A seedling's stem want's a dry environment to grow and thrive in. 1034 is a dry foam, repelling water keeps the stem able to transpire. A dry collar dis-allows adventitious root growth, encourages secondary woody growth. The seedling collar is a washable, re-useable, environmentally safe and a recyclable component.

Spec. Sheet
1034 foam
Polyurethane foam
Property value
Density 0.80 lbs./cu. ft.

IDF deflection 24-34

Resilience 45% minimum

Tensile strength 15 psi (lbs./in) squared, minimum

Elongation 150% minimum

Tear strength 1.4 lb./in. minimum compression set 10% maximum

Compression set @ 50% 10% maximum

Volumetric air flow rate 13 cu. ft./min.

Root Guide Tool, Polypropylene, FIG. 3

The root guide tool is made of polypropylene resin, made with an extrusion machine. FIG. 3 dimensions are, OD ¼", × length, 1¼", wall thickness of 4/1000". Extruded polypropylene tube, the inside walls are very smooth providing ease of glide as the root pushes the root tip out. The root guide is washable, re-useable, and environmentally safe and a recyclable component.

Seed and Seedling Collar Support Cuff, Polypropylene, FIG. 4

A cuff, open at both ends, FIG. 4, top ID 2", bottom ID 1 11/16", ×1", with two rows of ¼"×¼" reaches, cuff reaches are square cut-outs. The cuff is the standard 2" size that will fit in existing hydroponics systems as a replacement for standard 2" net pots. The seed germination nor the seedling collars are not tapered as is the collar support. The tapering at the bottom allows for the foam to push into the reaches. The reach captures the foam when it relaxes into the holes. Thus providing support by squeezing the foam to add pressure assuring a tight hold on the seed, root guide and or seedling. The support cuff is washable, re-useable, environmentally safe and a recyclable component.

Figure 5:
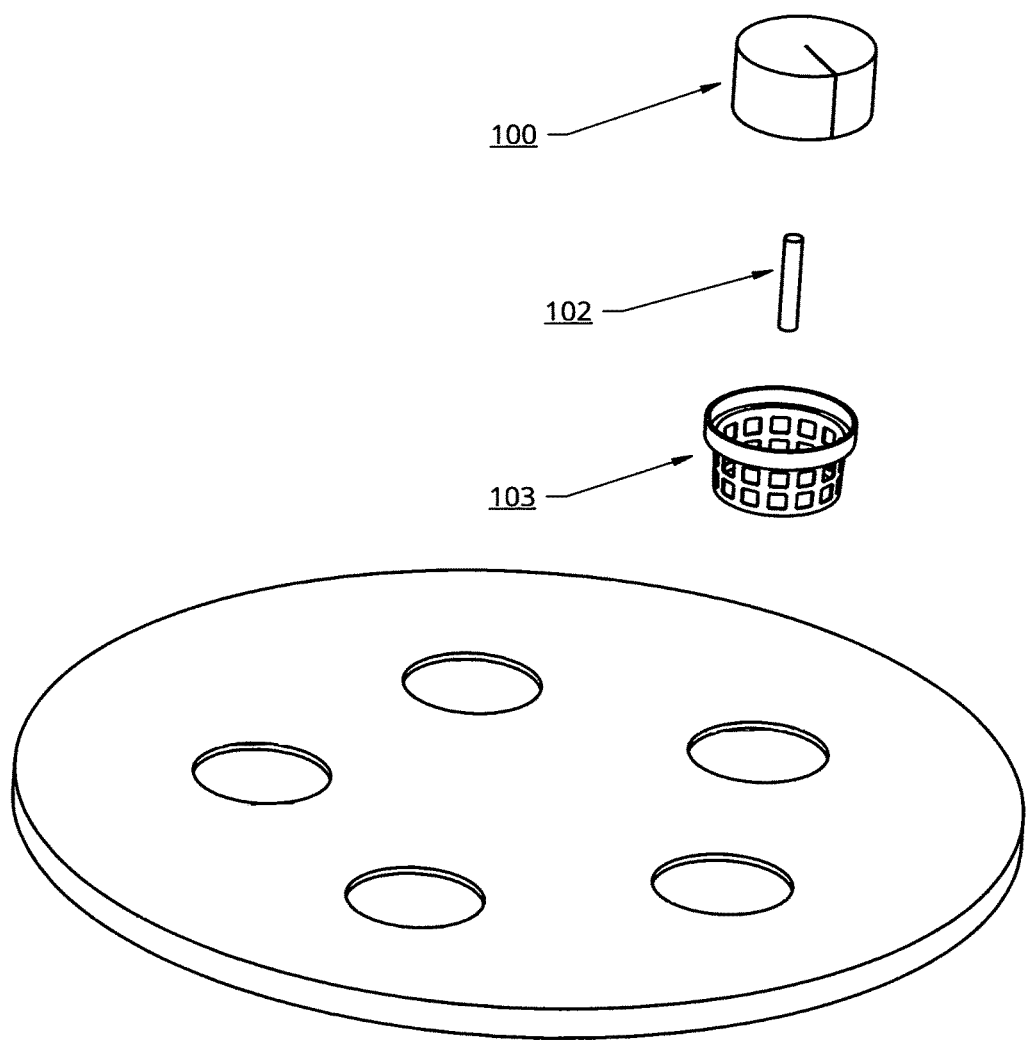
Figure 6A:
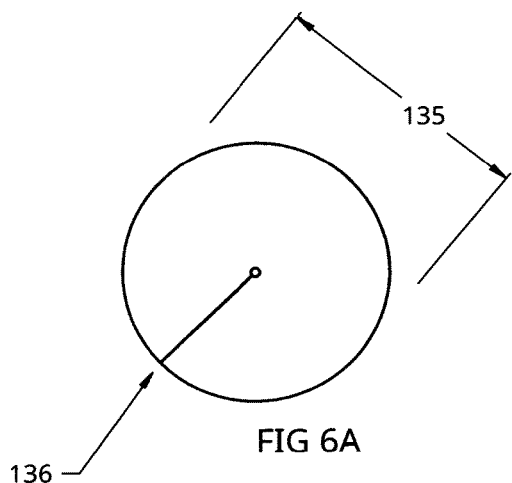
Figure 6B:
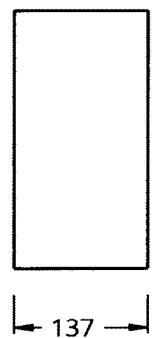
Figure 6D:
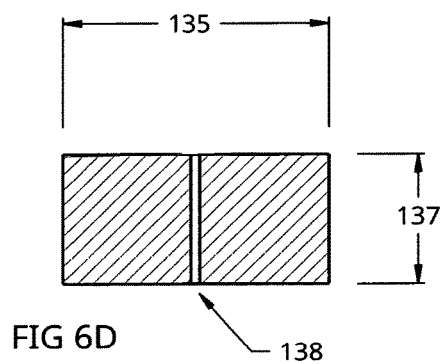
Figure 6C:
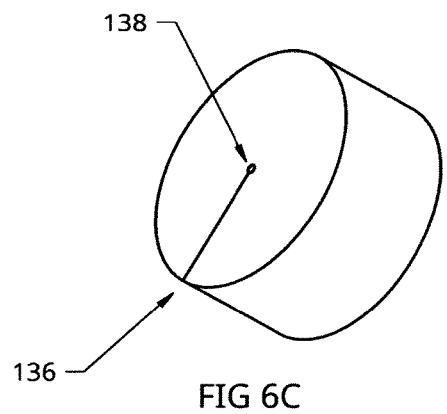
Figure 8A:
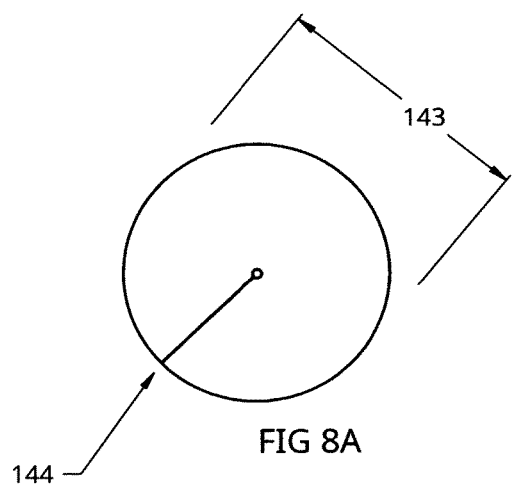
Figure 8B:
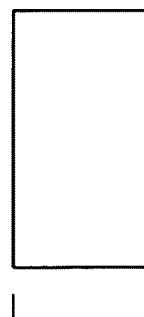
Figure 8D:
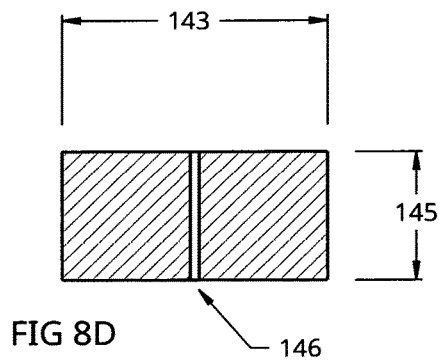
Figure 8C:
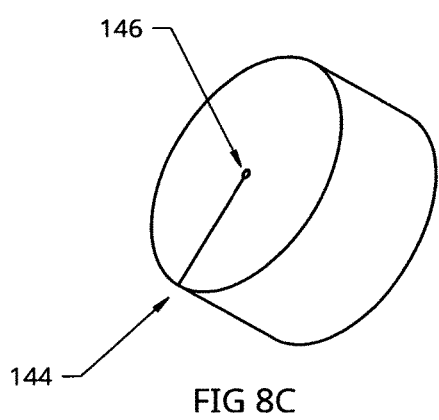
Figure 9A:
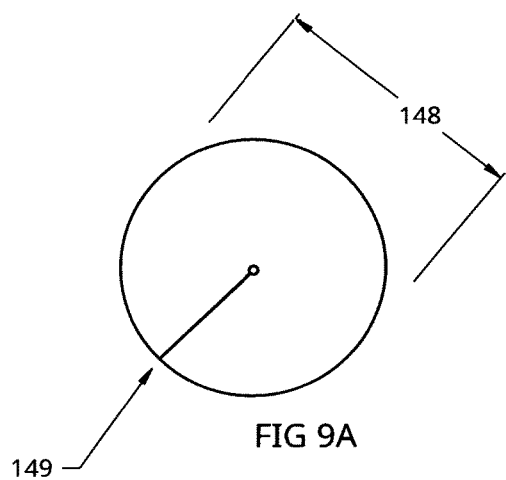
Figure 9B:
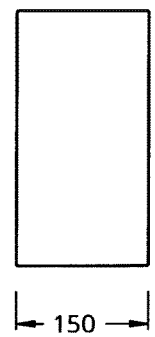
Figure 9D:
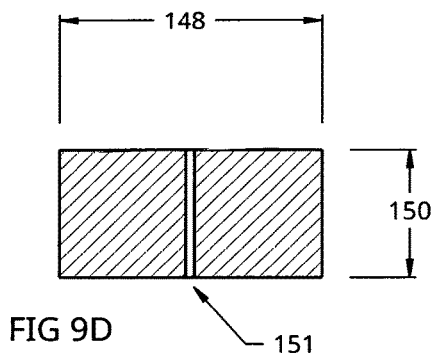
Figure 9C:
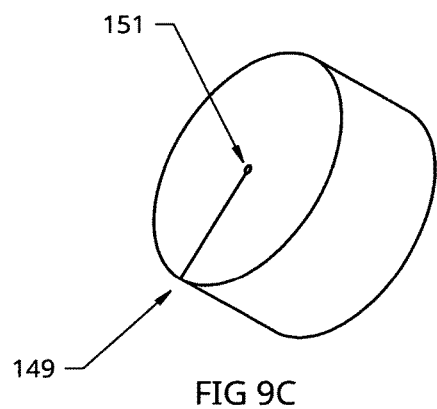

Dry, Vegetation Growth Collar, Polyurethane Foam 1034 FIG. 5

One vegetation collar is made of polyurethane foam 1034, dry, OD is 6", ×½" thick. A cut made from the center out to the perimeter the full depth of the collar for plant placement. There is a ⅜" center hole cut from top to bottom at the center. This hole is cut to allow plant stem space within vegetation collar. When utilizing the vegetation collar the horticulturalist is moving from a 2" cuff to a larger support cuff 6"×3" for the vegetation collar and a separate grow container.

Wet, Vegetation Growth Collar, Polyether Polyurethane Foam T 50 FIG. 5

One vegetation collar is made of Polyether polyurethane foam T 50, wet, OD is 6", ×1½" thick. A cut made from the center out to the perimeter the full depth of the collar for plant placement. There is a ⅜" center hole cut from top to bottom at the center. This hole is cut to allow plant stem space within vegetation collar. T 50 wet stiff foam, plant example; early tomatoes, stocky plant, heavy stem, fast growth. Experience will teach which one to use for conditions and plant species. The collar is washable, re-useable, environmentally safe and a recyclable component.

Dry, Fruiting/Flowering Growth Collar, Polyurethane Foam 1034 FIG. 6

One fruiting/flowering collar is made of polyether polyurethane foam 1034, dry, OD is 6", ×3" thick. A cut made from the center out to the perimeter the full depth of the collar for plant placement. There is a ⅜" center hole cut from top to bottom at the center. This hole is cut to allow plant stem space within vegetation collar. The collar is washable, re-useable, environmentally safe and a recyclable component.

Wet, Fruiting/Flowering Growth Collar, Polyether Polyurethane Foam T 50 FIG. 6

One fruiting/flowering collar is made of polyether polyurethane foam T 50, wet, OD is 6", ×3" thick. A cut made from the center out to the perimeter the full depth of the collar for plant placement. There is a ⅜" center hole cut from top to bottom at the center. This hole is cut to allow plant stem space within vegetation collar. The collar is washable, re-useable, environmentally safe and a recyclable component.

Experience will teach which collar to use within differing conditions. Vegetation or flowering collars to which there are 2 each, work well in differing conditions, one size does not fit all.

6" Vegetation and Flowering Collar Support Cuff, FIG. 7

A plastic injected polypropylene molded lid with a support cuff incorporated, open at both ends, with lid OD of 12", a center collar support cuff, the top opening ID of 5¾", a bottom opening ID of 5¼", collar support depth of 3", two rows of reaches for collar support, dimensions are ⅜"×¼". Washable, re-useable and recyclable.

Light Reflecting Shield, FIG. 8

A flat, round disk of white plastic sheeting OD 12" in, 6 ml thick, with a ⅜" hole in the center, with a cut from center to outside perimeter. Washable, re-useable and recyclable.

EXO—Top Cedar Wood Collar, a 2 Piece Stem Exterior Mount Collar, FIG. 9

Made of Cedar Wood, but not Limited to Cedar Wood.

Top Cedar wood collar consists of two pieces of cedar wood held together with 2, 3"×⅛" toggle bolts, collar length is 12", width ¾", height 2¾", bridge bar 8", foot 2", ⅛" screw pass through hole. The center of the top EXO collar has stability grooves cut into the wood on both facing halves. Total length of stability section is 3¼", the stability grooves are 3/16" deep, ¼" wide, and separated by ¼". The EXO collar is washable, re-useable, environmentally safe and recyclable.

Figure 10A:
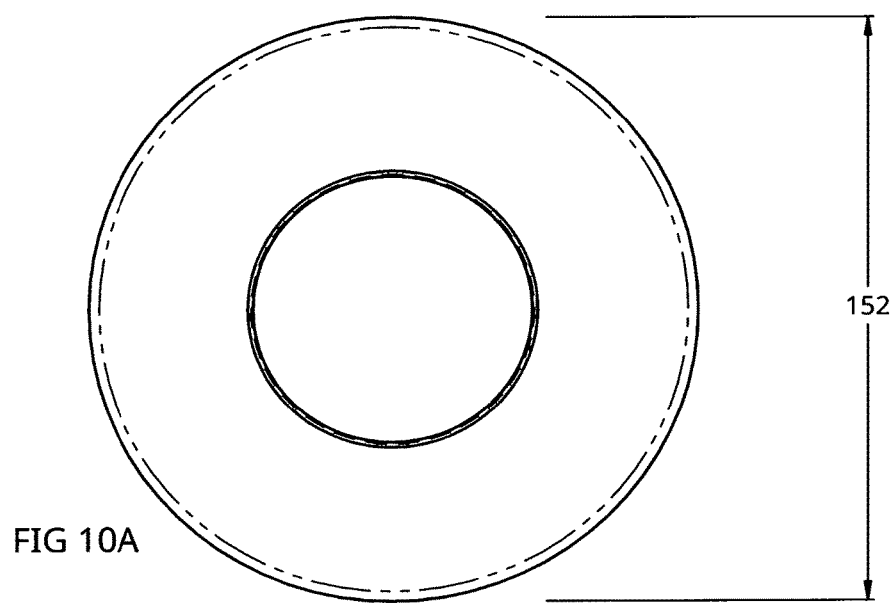
Figure 10B:
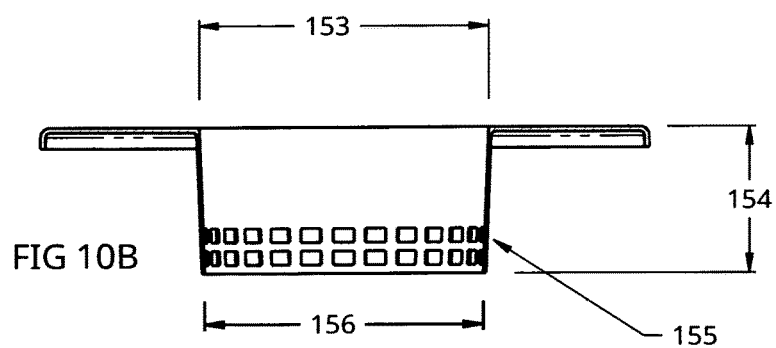
Figure 11A:
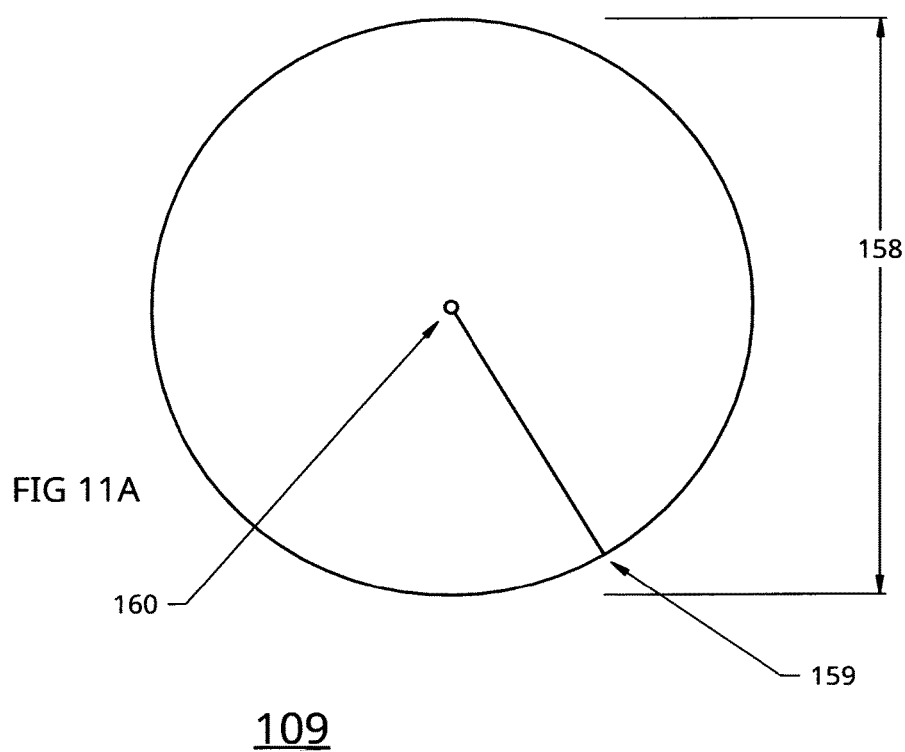
Figure 11B:
Figure 12:
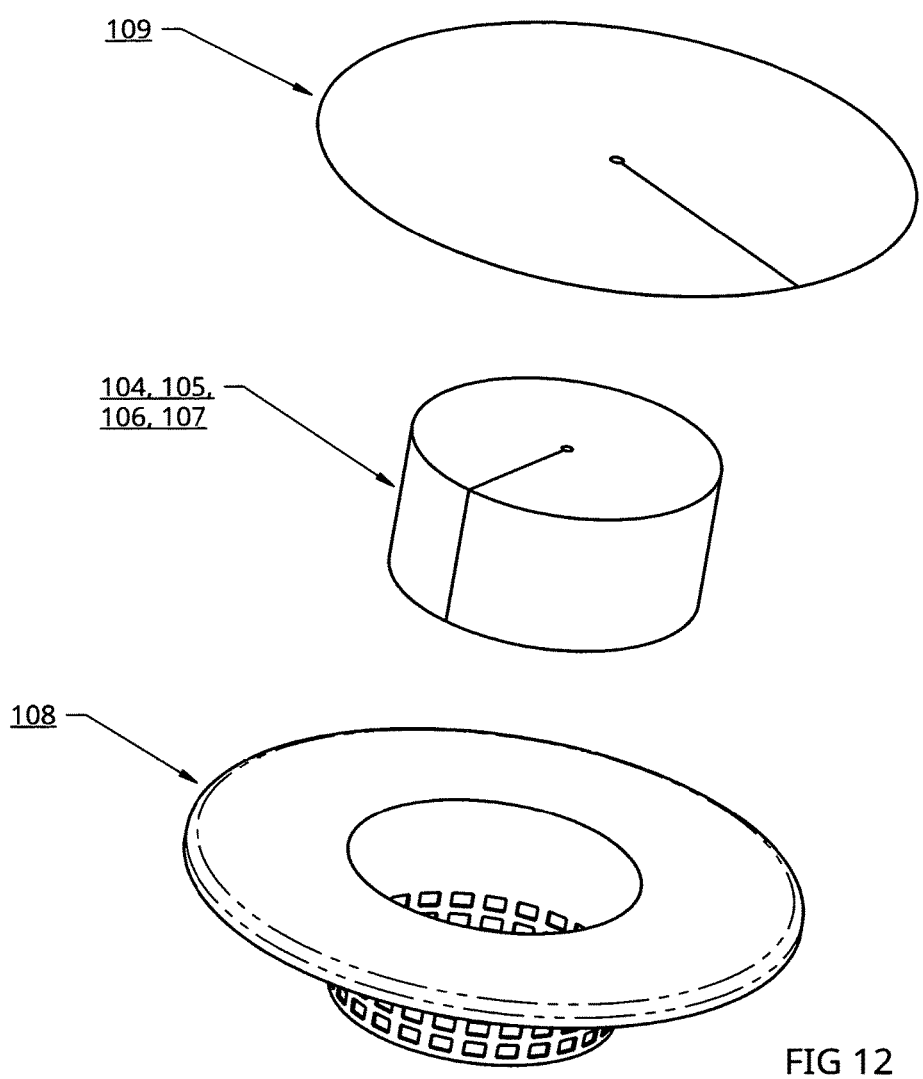
Figure 14A:
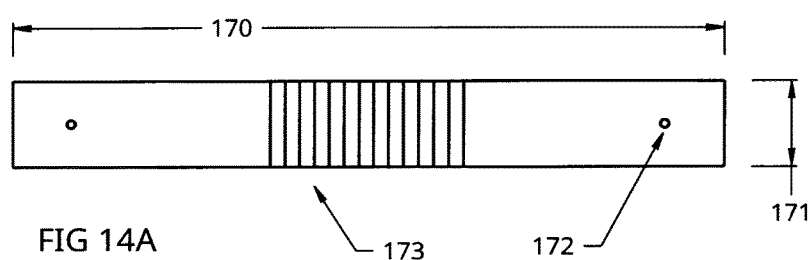
Figure 14B:
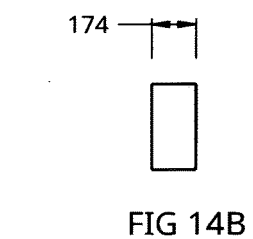
Figure 14D:
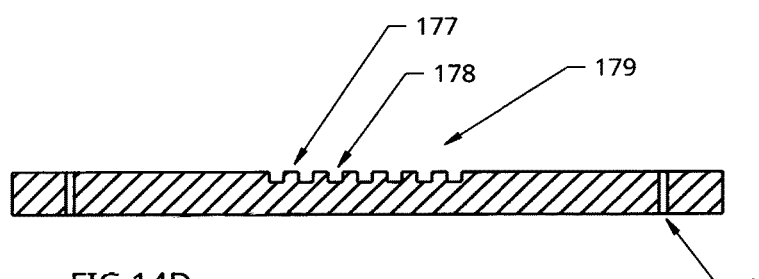
Figure 14C:
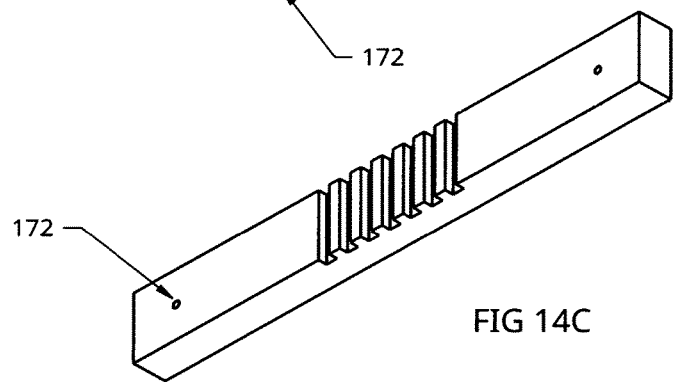
Figure 15:
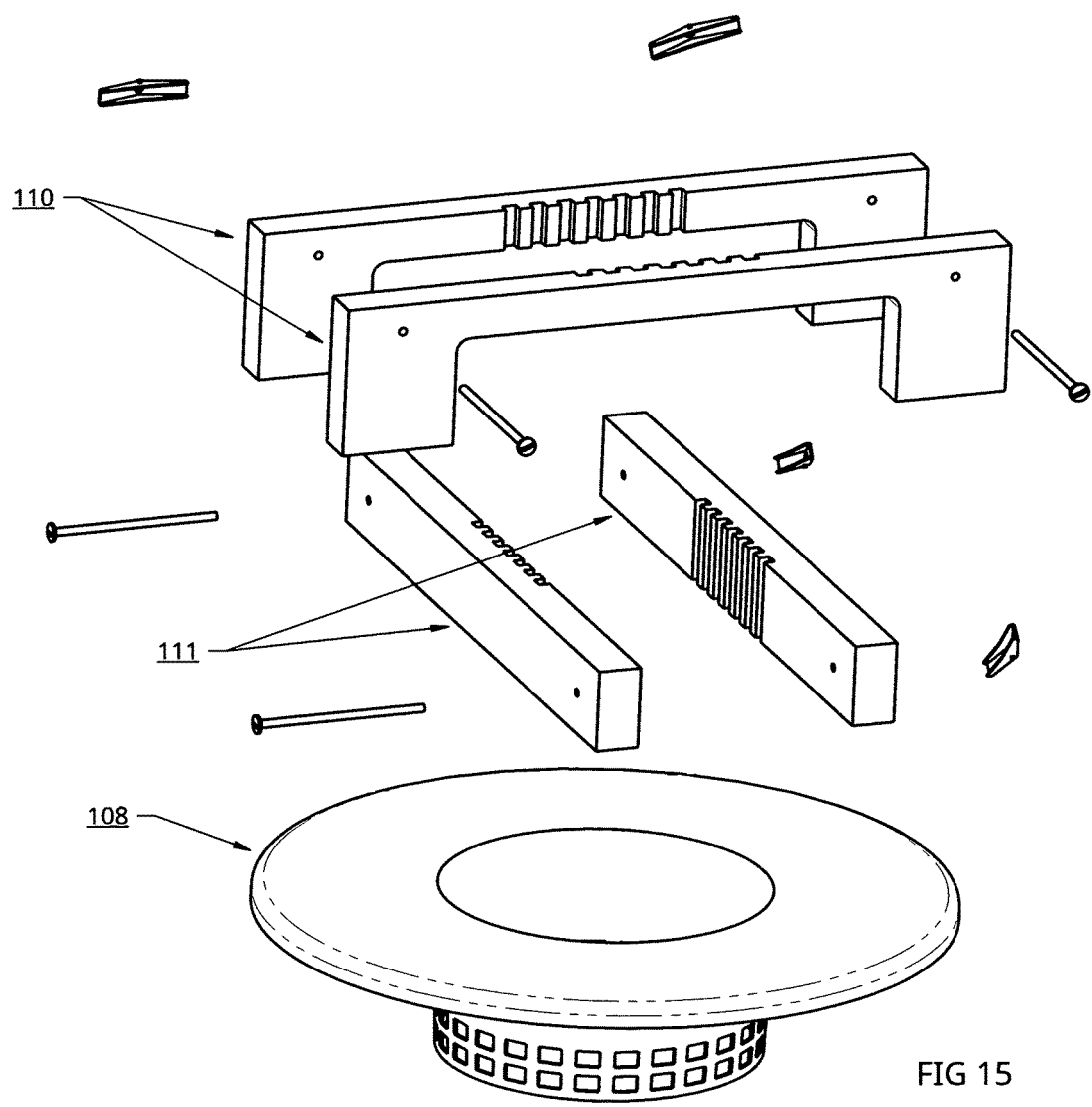
Figure 16:
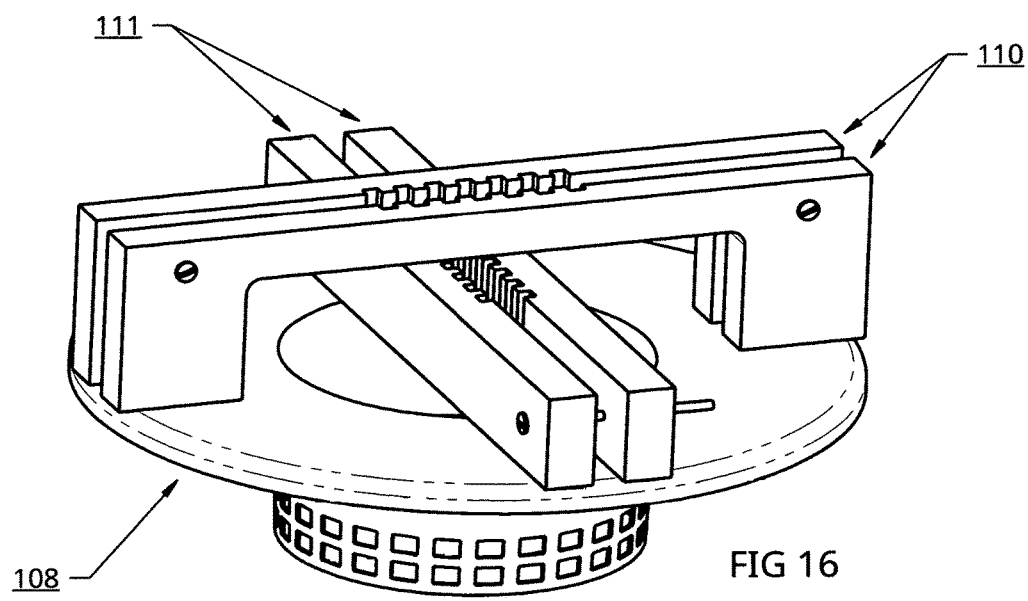

EXO—Bottom Cedar Wood Collar, a 2 Piece Stem Exterior Mount Collar, FIG. 10

Made of Cedar Wood but not Limited to Cedar Wood,

The bottom unit consists of two pieces of cedar wood held together with 2, 3"×⅛" toggle bolts, length 12", width ¾", height 1½", ⅛" pass through hole. The center of the bottom EXO collar has stability grooves cut into the wood on both facing halves. Total length of stability section is 3¼", the stability grooves are 3/16" deep, ¼" wide, and separated by ¼".

The EXO collar is washable, re-useable, environmentally safe and recyclable.

Uses,

As a replacement for all existing mediums utilized in the aqua-ponics, aero-ponics, hydroponics/deep water culture systems wherever they are in use, plant collars can replace inert single use mediums within these existing systems.

To hand make a set of collars requires that you have foam, not any foam works. Industrial foam such as foam cushioning for furniture can be used, but it will leach base chemicals such as ether and damage the plant stem and roots. This will happen with most industrial foams except medical grade, and specialty foams. If a person has foam and an understanding of the objective that is to be achieved and given instruction anyone can make the collars, find a plastic tube for a root guide, a bucket of water with fertilizers.

Future Uses

Any and all indoor cultivation, all rooftop and hothouses, city center food production, all aqua-ponics, all aero-ponics, Desert island food production, research bubbles in under-ocean living with artificial light and reverse osmoses water, ponds, lakes and streams using solar pumps through reverse osmoses units with auto-feed fertilizing technology. We must anticipate the needs of our future and be ready to meet the basic need of food production with a system that can be adapted to all environments, whether they are here on earth or even potentially on Mars and beyond.

4 Stage 11 Component Hydroponic Plant Collar Insert System

Example of Use; Complete Growth Cycle Seed to Flower

Starting with any seed, one must first understand the plant you want to grow. Then using the hydroponics component system, seed orientation is critical, the seed must be loaded into the germination collar in the correct orientation. Understanding the characteristics of the seeds you are loading leads to the success in plant propagation. That is to say that all seeds push root out of a seed husk or perianth. How that happens you must know and understand, the plant's root cap survival and hence plant survival depends on your knowledge of seed characteristics.

Seeds have a front, back, top and bottom. A seed's root tip exits the husk via a crack along the top seam on the upper side of the seed. The lower side of the seed is the bottom or foot, which the seed uses to push the dirt out of the way when unfurling or growing out of soil. After exit from soil the seed with husk or perianth, continues to split with the cotyledons opening first and then the opening up of its primary leaves.

Seed into Seed Germinating Collar

The seed germinating collar is a water attracting foam, seed germination requires moisture, T 50 foam is water absorbing, to allow for seed germination, a stiffer foam, allowing root guide grip and external grip into collar support reaches.

To load the seed into the seed germinating collar you must first understand the orientation of the seed you are to grow, place it ⅛" below lip of collar, orient seed with top (the seam where the root will exit the husk) in line with split in the foam, seed front pointing down, back of the seed or where the seed attached to the flower, facing up, and the bottom or foot to the back of the split in the foam. Add root guide tool and close, place collar in support cuff and then into hydroponics system.

Placing the Root Guide Tool into Seed Germinating Collar

The root guide tool is a plastic tube, 1¼"×¼". Guide should be placed ¹⁄₁₆" to ⅛" below the front of the seed. As seed husk splits open, the root cap protrudes, and root cap should be looking right into the guide. Hence, the root tip grows into root guide tool and down through it. Looking at the foam with the seed resting in the cut, add the root guide by sliding the guide into the cut and down to it's base. Visual inspection is simple, adjustment is simple and placement of the combined instrument into the collar support cuff and completed assembly into the hydroponics system.

The support cuff has two rows of reaches at it's base, these are to capture the foam. The foam is compressed in the collar support and the reaches allow for expansion into the openings, this supports the collar. When placing combination of collar and guide into support cuff you squeeze the foam together reducing size and push into the support watching to see that reaches fill with foam and that the collar fits top and bottom flush with collar support.

Mounting the seed,

An Explanation of Primary Seed Growth

As the seed grows or pushes it's root down and out of the root guide, the head of the seed is not growing out of the foam. This action is handled by the horticulturalist, a human assist. This action is normally handled by the plant when it un-furls pushing up out of the soil and in so doing pulls off the seed husks, both halves, revealing the cotyledons and primary leaves. Using collars over water the root does not grow into a material that give's it a foundation in order to push up and out. The foam captures the head, this is intentional, and must be moved out by hand. With the head captured, the seed puts more emphases on pushing the root out and this means that the stem is extending out pushing before it the root crown and root tip with gel cap. Practice and inspection will teach when to move the seed head out of the foam, my experience tells me the root needs to protrude out the bottom of the root guide tool ¾". To pull the seed head out of the foam and mount it above collar's foam surface you will use the root guide tool to move the plant. Remove the collar support cuff from the hydroponics system, remove the collar with seedling and root guide tool, from the collar support cuff. After removing the collar from within the support cuff, hold collar in one hand and split the foam revealing root guide tool with seedling's root passing through it. If root guide tool placement was correct the seedling will be balanced within the root guide tool with equal weight from the seed head to protruding root. Grasp the root guide tool with the index finger and thumb and pick up the seedling, move the head back, up and out of the foam, placement of seedling head is to the back of the foam split. Then slide the root guide tool back down the root leaving the seed head and ¼" of stem exposed. Now place the root guide tool with primary root back in it's original location within the seed germinating collar. Close the collar and squeeze the collar back into the collar support cuff and the support back into the hydroponics system. The seedling can now shed the seed husk, the husk is saturated with water and can be pulled off by hand easily. With the shedding of the husk the cotyledons are exposed and within these are the primary leaves. As the cotyledons spread, primary leaves open up and start to grow. The seedling is stabilized by the foam that squeezes around the stem just above the root guide tool, this support is given by proper placement of the root guide tool. This is enough foam bulk to support the seedling at this stage of growth and what we are wanting at this stage is for the root, root crown and stem to grow long enough to allow seedling to be moved from the germinating collar and placed in a seedling collar and the root guide tool removed. Thus allowing the seedling to be on it's own to grow into the water. This is accomplished by inspecting the seedling as it grows over the next two or three days. This is so simple, remove the support, remove the collar with seedling and split the collar and take a look. The seedling will need to be kept wet, a spray bottle of Reverse Osmoses, low ppm water works best. Once root crown can be exposed it is time to move seedling into a seedling collar.

Seedling into Seedling Collar,

The seedling is now large enough to be move into the seedling collar which is a dry, soft collar, a little deeper and warmer. The seedling will stay in this collar until it grows large enough to be moved into a permanent container. As before, remove the collar support cuff from hydroponic system, then remove the seed germinating collar with seedling, open up the foam collar and inspect the seedling. At this time and during this move, it is best to clean any debris, collected root scaling. A soft artist's paint brush and spray bottle of water is best. Before you work on plants wash your hands with anti-bacterial soap. Now pick up the seedling in the root guide tool and remove it from the germination collar and place it into the seedling collar. Note the root crown, position the root crown just under the collar, exposed to the elements, root crowns love fresh air circulation and a mist of water. They do not like to be wet and with zero air circulation, this is suffocating to any plant grown in hydroponics. This should put the stem and leaves well above the seedling collar surface with root crown in a perfect place just below the seedling collar. Remove the root guide tool by sliding the root guide over the roots while inspecting this hidden area. Spray with water and check for cleanliness. Seedling collar with plant can now be placed back into collar support cuff and then back into the hydroponics system. Seedling should be healthy and growing fast. All the handling, if done gently and with clean hands, doesn't bother the plant if you keep it wet. This type of handling has never been experienced before now. The ability to remove, inspect, clean and not harm the plant development, that is a hydroponic performance component system at work.

Seedling into Vegetation Collar

Placing plant into the vegetation collar, 6"×1½" These are the same two foams used but larger collars, T 50, wet but stiffer, and 1034 dry but softer. If you are growing a tall plant that grows quickly, use 1034 collar, the T50 is dry and large but soft and is used for smaller stemmed or stalked plants, like Kale. Experience will teach which one will work under which hydroponic conditions, stiff or soft collars. The time duration or photo period of vegetation collar use is dependent on type of plant, light intensity, fertilizer schedule, ambient temperature of room, temperature of water and grower's attitude, these determine growth speed and plant bulk, about two weeks for the vegetation growth cycle.

Placing the seedling into a vegetation collar is to move the seedling from it's communal bucket (See illustration page 5/14) with the 2" seedling collar and support cuff to a 6" collar and support cuff. With a 6" collar the seedling is placed it a container of its own. The vegetation collar is larger, thicker and heavier to support future growth of a larger, heavier, maturing plant.

Placing the plant in the collar is just like moving seedling from seed germination collar to seedling collar. This is just a larger collar, but the plant is larger now and can be handled easily. You are moving it again, so you are also inspecting and cleaning, removing dead root and debris. This again, is a function we have not been able to do, inspecting root and root crown so intimately.

Light Shield Protection

The light shield (FIG. 8 on Drawing 11/14) is used for young vegetating plants until more mature branching and leafing occurs. The light shield protects against excessive heat created by indoor lighting systems that can lead to bacterial growth within the nutrient solution.

6-Inch Collar Support Cuff

This is a 12" bucket lid (FIG. 7 on Drawing 11/14) with integrated 6" round cuff at the center that extends down 3". The collar support cuff is open at both ends and has two rows of reaches to allow the large 6" by 3" collar's foam (FIG. 6 on Drawing 11/14) to push into the reaches, giving the collar support. Placing plants into the flower collar, 6"×3" deep.

Again here are the same two types of foam collars, 1034, wet but stiffer, and 50p dry but softer, they are the same diameter, twice the thickness of the vegetation collar allowing for greater support.

If you are growing a tall plant that grows quickly, experience will teach which one works best under which hydroponic conditions demanding stiff or soft collars. The flower collar is in place as long as fruiting time period lasts, for some plants, fruiting is also a time of growth to allow room on stems for fruit.

These plants will grow so tall that the use of the EXO cedar collar comes into use.

For placement of plant into flower collar, remove vegetation collar out from collar support cuff and remove collar from around plant stem. Replace with flower collar that conditions require, stiff or soft. Place plant with collar back into collar support.

With collar change the plant moves again, so you have the opportunity to inspect and clean and remove dead root and such. This again, is a function we have not been able to do, inspecting root and root crown so intimately.

Placement of Plant into the EXO-Cedar Plant Collar

This collar is a two section, 4-piece collar. (Drawing 13/14) A top and bottom section with both sections held together with toggle bolts. The top fits over the bottom at right angles or perpendicular securing the stem with stability grooves to prevent movement back and forth as the plant becomes top heavy with fruit or flowers.

These collars fit around the stem and are sized to allow plant stem to push and warp the wood as stem girth grows in diameter. This in turn allows the plant to grow into the stability grooves, securing the collar to the stem. Stability grooves enable the plant to grow and fill out into the grooves as the plant pushes outward growing in girth. The use of stability grooves is new to plant growth, a fresh idea utilizing the plants willingness to grow to fit its environment. The use of cedar is important because cedar is a natural insect repellent, a mold and fungi inhibitor, will not irritate the supported plant stem or cambric layer. Cedar is resistant to water damage, if harvested correctly, can be sustainable, flexes easily, returns to original form with soaking in water and drying, is reusable on the next plant, compostable if finished, won't rust if left out side in the rain. These are made by hand in our own work shop.

DRAWING REFERENCE NUMBERS INDEX

1/14 seed germination collar
  FIG. 1
    100 shows seed germination collar outside diameter 1⅞ inch
    101 shows center access cut from center to outer perimeter
    102 shows seed placement in cut
    103 shows root guide tool placement in cut
    104 shows seed germination collar thickness, 1 inch, top to bottom
2/14 seedling collar
  FIG. 2
    100 shows seedling collar outside diameter 1⅞ inch
    101 shows center access cut from center to outer perimeter
    105 shows seedling collar thickness 1¼ inch
3/14 root guide tool
  FIG. 3
    106 shows root guide outside diameter ¼ inch
    107 shows root guide wall thickness 4/1000 inch
    108 shows root guide length 1¼ inch
4/14 2-inch collar support cuff
  FIG. 4
    109 shows support cuff's top outside diameter 2 inches
    110 shows support cuff's bottom outside diameter 1 11/16 inch
    111 shows support cuff reaches ¼ inch squares
    112 shows support cuff depth 1 inch
5/14 expanded view of 2" collar, guide, cuff assembly
6/14 vegetation collars
  FIG. 5
    113 shows vegetation collar outside diameter 6 inches
    114 shows vegetation collar thickness 1½ inches 115 shows center access cut from center to outside perimeter
116 shows a center hole ⅜ inch
7/14 flower, fruiting collar
FIG. 6
113 shows flower collar outside diameter 6 inches
115 shows center access cut from center to outside perimeter
116 shows a center hole ⅜ inch
118 shows flower collar thickness 3 inches
8/14 flower, fruiting collar support cuff with cover
FIG. 7
119 shows collar support cover outside diameter 12 inches
120 shows dimension top of collar support cuff inside diameter 5¾ inches
121 shows dimension bottom of collar support cuff inside diameter 5¼"
122 shows dimension collar support cuff depth 3 inches
123 shows two rows of ⅜x¼ inch rectangular reaches
124 shows dimension for lip from support ring to edge of cover 3 inches
9/14 light/heat reflecting shield
FIG. 8
115 shows center access cut from center to outside perimeter
116 shows a center hole ⅜ inch
119 shows outside diameter of light reflector 12 inches
125 shows light reflector thickness 6 mil
10/14 assembly of light reflecting shield, flower collar and collar support cuff
11/14 EXO collar upper unit
FIG. 9
126 shows the upper EXO collar's over length 12 inches
127 shows the upper EXO collar's width ¾ inch
128 shows the upper EXO collar's height 2¾ inches
129 shows the upper EXO collar's cross bar 8 inches
130 shows the upper EXO collar's assembly hole ⅛ inch
131 shows the upper EXO collar's foot 2x½x2¾ inches
132 shows the upper EXO collar's plant stability grooves
133 shows the upper EXO collar's measurement between grooves ¼ inch
134 shows the upper EXO collar's measurement of grooves ¼ inch
135 shows the upper EXO collar's groove depth 3/16 inch
12/14 EXO collar bottom unit
FIG. 10
126 shows the bottom EXO collar's over length 12 inches
130 shows the bottom EXO collar's assembly hole ⅛ inch
132 shows the bottom EXO collar's plant stability grooves
133 shows the bottom EXO collar's measurement between grooves ¼ inch
134 shows the bottom EXO collar's measurement of grooves ¼ inch
135 shows the bottom EXO collar's groove depth 3/16 inch
136 shows the bottom EXO collar's height 1½ inches
137 shows the bottom EXO collar's width ¾ inch
13/14 EXO expanded view
138 EXO collars in expanded view
14/14 EXO assembly view
139 EXO collars in assembled view

INDEX OF FIGURE REFERENCES SYSTEM COMPONENT DEVICE FIGURES

100 T50 Seed Germination Collar
101 1034 Seedling Collar
102 Root Guide Tool
103 2" Cuff
Exploded View 100, 102, 103
104 1034, Vegetation Cycle Collar
105 T50, Vegetation Cycle Collar
106 1034, Flower Cycle Collar
107 T50, Flower Cycle Collar
108 6" Cuff
109 6" Cuff Heat Shield
110 Upper EXO Collar
111 Lower EXO Collar
Elements of T50 Seed Germination Collar
120 Collar Diameter
121 Die Cut to Center of Collar
122 Collar Width
123 Root Guide Location Within Collar
124 Seed Location Within Collar
Elements of 1034 Seedling Collar
125 Collar Diameter
126 Die Cut to Center of Collar
127 Collar Width
Elements of Root Guide Tool
128 Tool Wall Thickness
129 Tool Outside Diameter
130 Tool Overall Length
Elements of the 2 Inch Cuff
131 Cuff's top Diameter
132 Cuff Depth
133 Cuff Bottom Diameter
134 Cuff Reaches/Cutouts
Elements of 1034 Vegetation Cycle Collar
135 Collar Diameter
136 Die Cut to Center of Collar
137 Collar Width
138 Collar Center Hole
Elements of T50 Vegetation Collar
139 Collar Diameter
140 Die Cut to Center of Collar
141 Collar Width
Elements of 1034 Flower Cycle Collar
143 Collar Diameter
144 Die Cut to Center of Collar
145 Collar Width
146 Collar Center Hole
Elements of T50 Flower Cycle Collar
148 Collar Diameter
149 Die Cut to Center of Collar
150 Collar Width
151 Collar Center Hole
Elements of the 6 Inch Cuff
152 Cuff overall Diameter
153 Cuff's Top Diameter
154 Cuff Depth
155 Cuff Reaches/Cutouts
156 Cuffs Bottom Diameter
Elements of 6 Inch Cuff Heat Shield
158 Heal Shield Diameter
159 Die Cut to Center of Heat Shield
160 Heat Shield Center Hole
157 Heat Shield Thickness
Elements of the Upper EXO Collar
161 Collar length
162 Collar Height
163 Collar Plant Stability Groves
164 Collar Foot Length
165 Collar Width
166 Collar attachment hole 167 Collar Groove width
168 Collar Groove Depth
169 Collar Groove Count
Element of the Lower EXO Collar
170 Collar Length
171 Collar Height
172 Collar Attachment Hole
173 Collar Plant Stability Groves
174 Collar Width
177 Collar Groove Width
178 Collar Groove Depth
179 Collar Groove Count

The invention claimed is:

1. A 4-stage, multi-component, hydroponic plant system comprising:
   a) a plant seed germination collar, made of polyether polyurethane foam with a cell count of 50 ppi, a density of 1.4 lbs./cu. ft., a 25% compression deflection force of 0.55 lbs./sq. in., a minimum tensile strength of 22 lbs./sq. in., a minimum elongation of 200%, a minimum tear strength of 4.5 lbs./in., a maximum compression set @ 50% deflection of 20% loss, and a maximum 25% CLD autoclave loss of 20%; and wherein the plant seed germination collar has dimensions of 1⅞" diameter×1" thick and is cut from the center to the outside perimeter;
   b) a plant root guide tool, made of an extruded polypropylene tubing with an outer diameter of ¼", a length of 1¼" and with a wall thickness of 4/1000";
   c) a plant seedling collar made of polyurethane foam having a density of 0.80 lbs./cu. ft., an IDF deflection of 24-34, a minimum resilience of 45%, a minimum tensile strength of 15 psi, a minimum elongation of 150%, a minimum tear strength of 1.4 lb./in., a maximum compression set of 10%, and a volumetric air flow rate of 13 cu. ft./min; said plant seeding collar having dimensions of 1⅞" diameter×1¼" thick and which is cut from the center to the outside perimeter;
   d) a round seed and seedling collar support cuff made of injection molded polypropylene, said seed and seedling support collar is open at both ends and has an upper opening with an inside diameter of 2", a bottom opening with an inside diameter of 1 11/16" and a depth of 1", said seed and seedling support collar further comprising two rows of ¼"×¼" cutouts;
   e) a vegetation collar made of polyether polyurethane foam with a cell count of 50 ppi, a density of 1.4 lbs./cu. ft., a 25% compression deflection force of 0.55 lbs./sq. in., a minimum tensile strength of 22 lbs./sq. in., a minimum elongation of 200%, a minimum tear strength of 4.5 lbs./in., a maximum compression set @50% deflection of 20% loss, and a maximum 25% CLD autoclave loss of 20%; said vegetation collar having an outside diameter of 6", a thickness of 1½", a ⅜" center hole, and a cut from the center hole to the outside perimeter;
   f) a vegetation collar made of polyurethane foam having a density of 0.80 lbs./cu ft., an IDF deflection of 24-34, a minimum resilience of 45%, a minimum tensile strength of 15 psi, a minimum elongation of 150%, a minimum tear strength of 1.4 lb./in., a maximum compression set of 10%, and a volumetric air flow rate of 13 cu. ft./min; said vegetation collar having an outside diameter of 6", a 1½" thickness, a ⅜" center hole, and a cut from said center hole to the outside perimeter;
   g) a flower/fruiting collar made of polyether polyurethane foam with a cell count of 50 ppi, a density of 1.4 lbs./cu. ft., a 25% compression deflection force of 0.55 lbs./sq. in., a minimum tensile strength of 22 lbs./sq. in., a minimum elongation of 200%, a minimum tear strength of 4.5 lbs/in., a maximum compression set @50% deflection of 20% loss, and a maximum 25% CLD autoclave loss of 20%; said flower/fruiting collar having an outside diameter of 6", a 3" thickness, a ⅜" center hole, and a cut from said from said center hole to the outside perimeter;
   h) a flower/fruiting collar made of polyurethane foam having a density of 0.80 lbs./cu. ft., an IDF deflection of 24-34, a minimum resilience of 45%, a minimum tensile strength of 15 psi, a minimum elongation of 150%, a minimum tear strength of 1.4 lb./in., a maximum compression set of 10%, and a volumetric air flow rate of 13 cu. ft./min; said flower/fruiting collar having dimensions of 6" diameter×3" thickness, a ⅜" center hole, and a cut from said center hole to the outside perimeter;
   i) an upper collar consisting of two pieces of cedar wood held together with two 3"×⅛" toggle bolts, wherein said two pieces of the upper collar each have a total length of 12" comprising an 8" bridge bar and two 2" feet each comprising a ⅛" screw pass through hole; the two pieces of upper collar further comprising a width of ¾", a height of 2¾", and wherein the center of the bridge bar further comprises a centrally located stability groove section wherein the total length of stability groove section is 3¼", and wherein the stability grooves are 3/16" deep, ¼" wide, and separated by ¼";
   j) a lower collar consisting of two pieces of cedar wood held together with two 3"×⅛" toggle bolts wherein said two pieces of the lower collar each have a length of 12", a width of ¾", a height of 1½", and wherein each of said two pieces of the lower collar has a ⅛" screw pass through hole at each of the two ends; each of said two pieces of the lower collar further comprising a centrally located stability grooves section with a total length of 3¼", and wherein the stability grooves are 3/16" deep, ¼" wide, and separated by ¼";
   k) a light and heat reflecting shield made of polypropylene having an outside diameter of 12", a thickness of 6 mm, a ⅜" center hole and a cut from said center hole to the outside perimeter; and
   l) a round and tapered flower/fruiting collar support cuff made of polypropylene which is open at both ends, wherein one end has an inside diameter of 5¾", the other end has an inside diameter of 5¼", and wherein said flower/fruiting collar support cuff further has a depth of 3" and two rows of ⅜"×¼" rectangular cutouts.

* * * * *